March 20, 1928.
L. LEBERT
1,663,378
WAFFLE IRON OR MOLD
Filed March 11, 1927
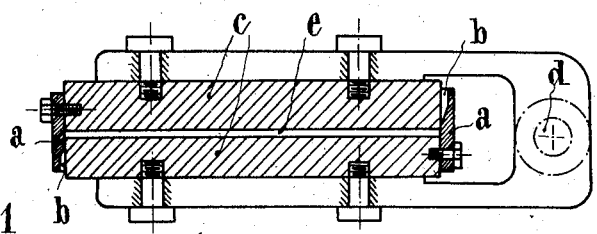
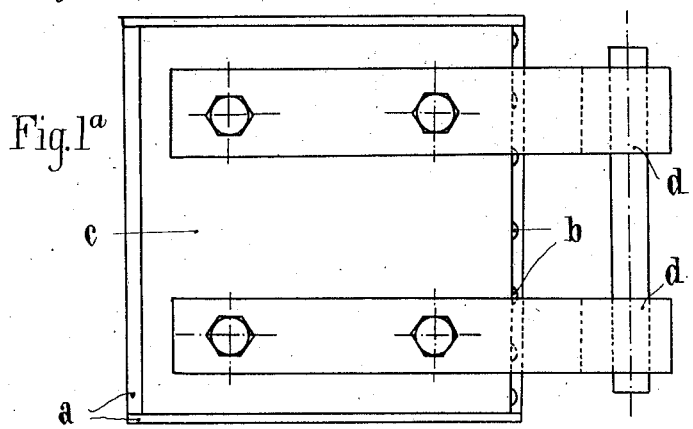
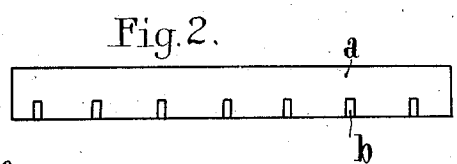
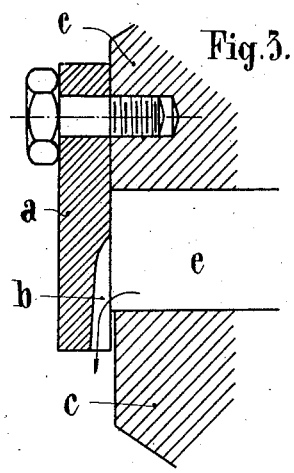
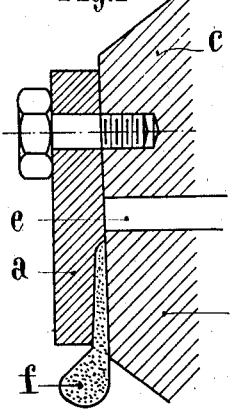
INVENTOR:
Louis Lebert
BY
ATTORNEY Patented Mar. 20, 1928.

1,663,378

UNITED STATES PATENT OFFICE.

LOUIS LEBERT, OF PANTIN, FRANCE, ASSIGNOR TO SOCIETE DES ANCIENS ETABLISSEMENTS A SAVY, JEANJEAN & CO., OF COURBEVOIE, FRANCE, A CORPORATION OF FRANCE, BAKER PERKINS, LTD., OF LONDON, ENGLAND, A CORPORATION OF GREAT BRITAIN, AND HIMSELF.

WAFFLE IRON OR MOLD.

Application filed March 11, 1927, Serial No. 174,546, and in France March 12, 1926.

The present invention relates to machines and in general to all apparatus serving for the baking of flat biscuits or "waffles" of the type in which the material serving for the manufacture of the waffles, such as batter or paste, is delivered to molds or "irons" consisting of two metal plates movable in relation to each other and carried, for instance, by hinged members, which plates, after the introduction of a layer or batter spread over them, are closed by being placed one against the other and are then either heated on the spot or passed into a heated baking chamber in any manner.

The object of the present invention is a waffle-iron made so as to obtain complete sheets of waffles without any scraping operation.

In the accompanying drawings which show the invention by way of example:

Figure 1 is a vertical sectional view of a type of waffle-iron made in accordance with the invention, and Fig. 1$^A$ is a plan view of the same.

Figure 2 is a side view of one of the strips arranged around the edges of the plates, and Fig. 2$^A$ is a cross section thereof.

Figure 3 is a partial section of the waffle-iron during the closing operation and Figure 4 a similar view of the waffle-iron when closed.

The improved waffle-iron is formed in the known manner by the union of two metal plates $c$ movable relatively to each other, for instance by rotation about the hinge $d$.

When the waffle-iron is closed the two plates are held parallel at a slight distance from each other according to the thickness of the sheet to be obtained.

The waffle-iron being opened, a certain quantity of batter is deposited between the plates, and spreads itself between the said plates when the latter are closed. In order to secure the complete filling of the waffle-iron it is necessary that a greater quantity of batter be provided than would be strictly necessary for obtaining the sheet. The excess batter is forced outwards and forms a portion of waste which in the ordinary procedure must be removed after baking, by scraping the edges of the waffle-iron with a knife before removing the sheet. This scraping operation is however completely dispensed with by the use of the present invention.

The waffle-iron is so formed that the space $e$ between the plates is completely or almost completely shut after closing the plates, this result being obtained, for example, by means of metal edging strips $a$ fitted and secured to either of the plates $c$.

The strips $a$, or members substituted therefor, are provided with recesses $b$ of variable number and of suitable shape, the general direction of which recesses is such that they lie in a plane normal to the plane of the plates and opening outwards at one end while stopping at the other end at some distance from the space between the plates (Figure 4).

In the course of closing the plates (Figure 3) the vapours produced by the baking escape through the recesses $b$ in the direction of the arrow and the section of said recesses is so chosen that the speed of outflow of the vapours is considerable. Owing to the sudden change of direction in the flow of the vapours caused by the shape of the recesses, the traction exerted on the batter (of which the inertia is considerable) by the vapours is extremely reduced and the waste appears in the form of small pellets $f$ of batter at the exit of the recesses.

When the closing is completed (Figure 4) the waste pellets are cut off and separated from the sheet of waffles the edges of which are left perfectly clean.

On opening the plates the waste $f$ falls off of itself leaving the sheet intact and complete.

The accompanying figures illustrate a special production by means of applied edging strips, but the invention extends to all arrangements in which the space between the plates is practically closed when the waffle-iron is closed and the vapour escapes during closing through narrow conduits showing a sudden change of direction.

I claim as my invention:

1. A waffle iron, comprising a pair of hingedly-connected, coacting plates having narrow recesses at their margins for the escape of vapours and excess batter from the iron when the plates are practically, but not completely, closed together and to shear off the excess batter when said plates are completely closed; said recesses being so shaped as to produce an abrupt change in the direction of movement of the escaping vapours and thereby cause the latter to reduce the traction exerted on the batter.

2. A waffle iron, comprising a pair of hingedly-connected, coacting plates, and metal edging strips attached to the plates and extending along their marginal faces in position to close the space between the plates when the latter are practically closed together; said strips having formed in their inner faces narrow recesses for the escape of vapours and excess batter which are adapted to communicate with such space and are so shaped as to produce an abrupt change in the direction of movement of the escaping vapours and thereby cause the latter to reduce the traction exerted on the batter.

3. A waffle iron, according to claim 2, in which the inner ends of the recesses are moved past the space between the hinged plates when the latter are completely closed together, whereby the excess batter in the recesses is sheared from the sheet of batter between said plates.

In testimony whereof I affix my signature.

LOUIS LEBERT.